Oct. 3, 1933.  A. W. FARRELL  1,929,240
AUTOMOBILE LOCK
Original Filed April 21, 1927  2 Sheets-Sheet 1
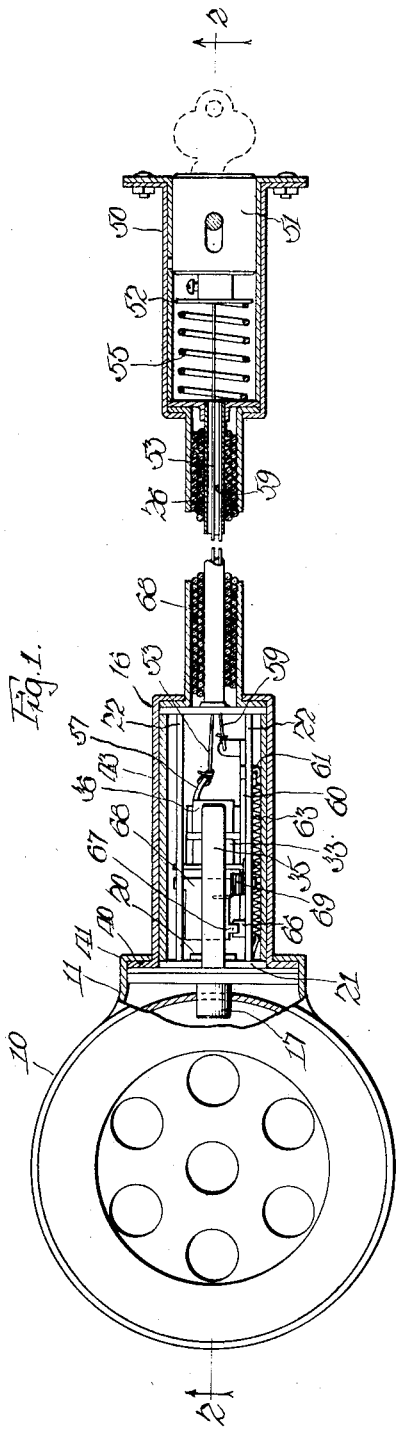
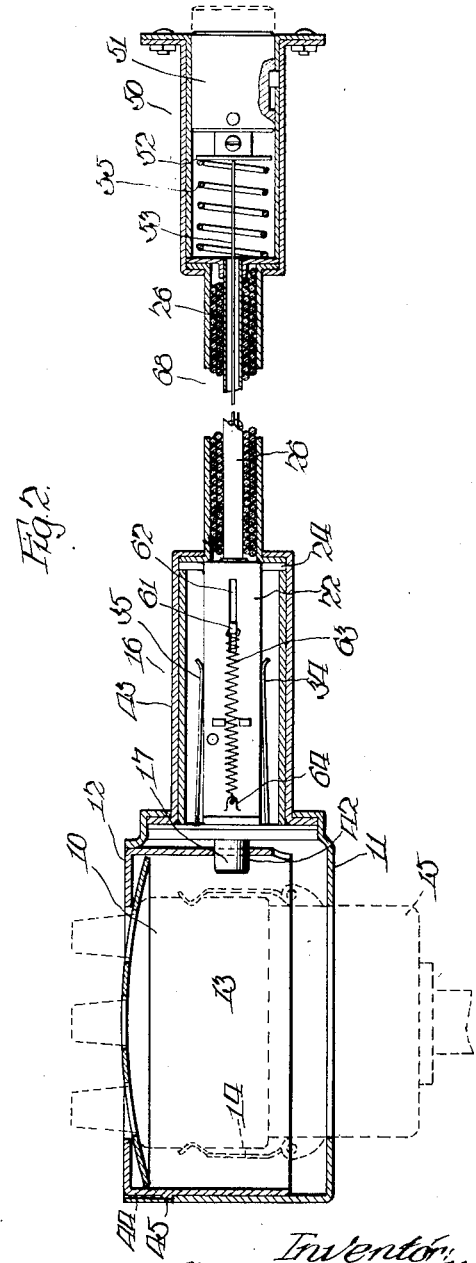
Inventor
Archie W. Farrell
By Jones, Addington, Ames & Seibold
Attys.

Oct. 3, 1933.  A. W. FARRELL  1,929,240
AUTOMOBILE LOCK
Original Filed April 21, 1927   2 Sheets-Sheet 2
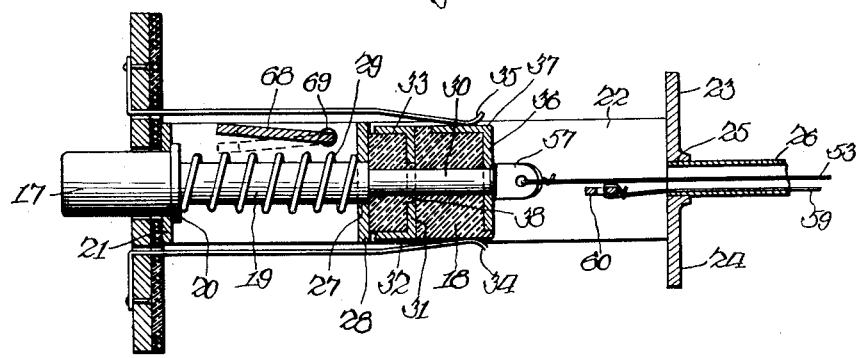
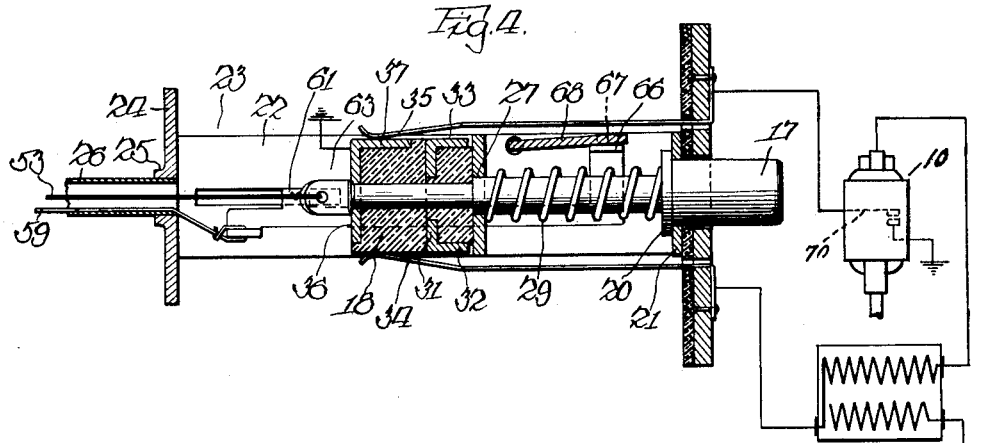
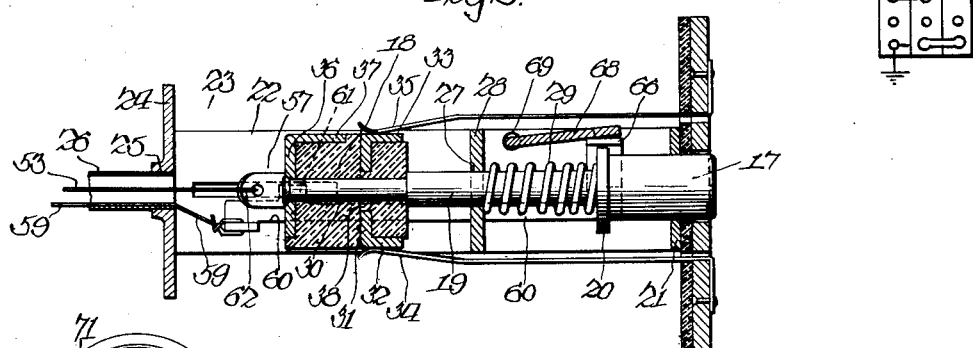
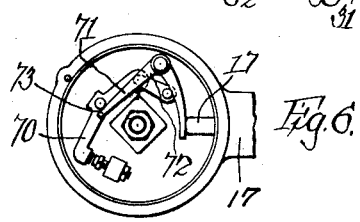
Inventor:
Archie W. Farrell Patented Oct. 3, 1933

1,929,240

UNITED STATES PATENT OFFICE 1,929,240

AUTOMOBILE LOCK

Archie W. Farrell, Chicago, Ill., assignor of one-fourth to Edward L. Kulick; Edward L. Kulick, administrator de bonis non of said Archie W. Farrell, deceased, assignor, by direct and mesne assignments, of one-twelfth to Clara M. Farrell, individually, one-sixth to Clara M. Farrell, as guardian, and one-half to General Motors Corporation, Detroit, Mich., a corporation of Delaware Application April 21, 1927, Serial No. 185,448
Renewed August 14, 1933

50 Claims. (Cl. 200—19)

My invention relates to automobile locks and more particularly to an improved type of ignition lock.

Specifically, the invention provides an improved locking mechanism for preventing access to the interior of the distributor after the ignition circuit has been broken and one side grounded.

The theft of automobiles today has become so great that the matter of safe locking against unauthorized use is a difficult problem. The types of locks largely in use are those known as the transmission, steering wheel and ignition locks. Transmission locks are of little value because they are inconveniently located and therefore are not always used, and further, their location permits them to become quickly clogged with dirt and readily rendered inoperative. The steering wheel lock is not desirable due to the requirements of positioning the wheel or turning the steering post before the bolt takes hold. On the other hand, ignition locks have heretofore been unreliable and unsafe because they were susceptible to tampering and the circuit easily shunted after broken by the locking mechanism.

My invention has for one of its objects the provision of an armoured housing for the timer-distributor mechanism adapted to be locked against removal, when the ignition circuit is broken, to render shunting of the circuit impossible at the timer-distributor mechanism. Although the locking mechanism disclosed herein is designed to open the circuit, when the housing is locked to the timer-distributor casing, it will be understood that the invention is much broader in scope and extends to any locking means which will operate to secure this housing against removal when the locking mechanism is actuated.

Another object of the invention is the provision of a locking mechanism which will automatically ground one side of the ignition circuit when the housing is locked to the timer-distributor casing and the circuit is broken.

A further object of the invention is in the provision of means interconnecting the locking mechanism and actuating means (which may be remotely disposed, say, on the dash board or some other convenient location in the driver's compartment) by flexible connections, including a blind connection, which, if access is obtained thereto and is mutilated, will automatically operate as an auxiliary lock that functions further to lock the mechanism against any attempt to free the lock by access to the proper connection.

A still further object of the invention is to ground the ignition circuit, when open, to render it impossible to determine which of these flexible connections is the proper connection operating to open the circuit and to lock the housing to the timer-distributor casing, should access be had to these connections.

Still further, my invention resides in the provision of a simple, reliable and expedient form of locking mechanism for the ignition circuit, which includes a movable contact having attached thereto a bolt adapted to be moved thereby, whereby when the contact operates to open the circuit, the bolt snaps into position to lock an armoured housing about the timer-distributor mechanism to prevent access thereto.

My invention also contemplates providing means for positively opening a contactor arm of the timer and holding the same in an open locked position when the locking mechanism is actuated to break the ignition circuit, so that in the event the locking mechanism is destroyed, the armoured housing about the timer-distributor mechanism effectively prevents shunting the circuit.

Other objects and advantages of my invention will be apparent from the following description when taken in connection with the accompanying drawings which form a part hereof.

In the drawings:

Figure 1 illustrates a lock embodying my invention associated with a timer-distributor mechanism of an ignition system, the view being a top plan view of the distributor with the lock connections in section;

Fig. 2 is a vertical sectional view taken on line 2—2 of Fig. 1 with the timer-distributor mechanism illustrated in dotted lines;

Fig. 3 is an enlarged detailed sectional view of the locking mechanism illustrating the locking bolt of the timer-distributor casing in locking position and the circuit broken and one side thereof grounded;

Fig. 4 is a similar view but looking at the opposite side, this view also illustrating the mechanism connected in an ignition system;

Fig. 5 is also a similar view but with the locking bolt withdrawn to nonlocking position and the circuit closed; and Fig. 6 is a detail view illustrating the manner of locking one of the contactor arms of the timer in open position by means of the locking bolt when thrown to locking position.

As illustrated in Figs. 1 and 2, the distributor 10 having the usual well-known breaker or contactor arm 70 is provided with an armoured housing 11 having a removable cap 12 which permits the removal of the distributor cap 13 when access of the interior of the timer-distributor mechanism is desired. As a matter of fact, the entire housing 11 may be removed from the distributor if so desired, but under ordinary circumstances only the cap 12 need be removed for access to the timer-distributor mechanism when it is desired to make normal repairs thereon, while the portion 11 is mechanically locked in position and cannot be removed without removing the timer-distributor unit. The usual spring locking detents 14 are shown herein as the means for holding the distributor cap 13 to the timer portion 15.

The locking mechanism, which I prefer to employ for holding the removable cap 12 to the armoured housing 11, comprises an armoured casing 16 of elongated formation adapted to contain a longitudinally movable bolt 17 anchored in a block of insulation 18.

Bolt 17 is reduced at 19 and a collar 20 is fixed adjacent to the bolt head to abut against an end plate 21. Plate 21 is suitably fastened to the outer end of the side arms 22 of a U-shaped frame member 23. Frame member 23 is provided with an innerconnecting end wall 24 between side arms 22 and is adapted to be furnished with an opening 25 into which extends a flexible tubing 26.

An intermediate plate 28 is rigidly fastened between the side members 22, this plate having a central opening 27 in which slides the reduced portion 19 of bolt 17. I prefer providing a coil spring 29 between fixed plate 28 and collar 20 carried on bolt 17.

The insulation block 18 is centrally apertured to receive and be fixed to stem 30. Centrally located in block 18 is a movable contact 31 provided with laterally turned portions 32 and 33 which are adapted to contact with the stationary spring contact fingers 34 and 35. The contact finger 35 may be connected to the distributor side of the ignition system while the contact finger 34 may be connected to the battery side of this circuit. At the end of block 18, a second contact 36 is fastened, this contact also having a laterally turned portion 37 which is adapted to contact with spring finger 35. Contact 36 may be connected in electrical relation with pin 30 of locking bolt 17, whereby, when the finger 35 is in engagement with contact 36, the circuit is grounded through this bolt. Movable contact 31 is cut away at 38 to avoid contact with the bolt 17.

Housing 43 of the locking mechanism is inserted in the distributor housing 11 by the turned-over portion 40 abutting against the inside of the end face 41 of this distributor housing. I prefer to employ alignment means for the housing cap 12, so that, when it is inserted in the housing 11, the locking bolt opening 42 will be in proper alignment to receive bolt 17 when it is released to move to locking position. This aligning means may comprise a groove 44 in the housing 11 and a pin 45 extending from the cap 11.

Suitably arranged on the dash board, or at some other convenient point on the automobile, is the key operated lock 50 of the usual construction. When in unlocked position, the barrel 51 of lock 50 is extended outwardly as shown by dotted lines in Fig. 2, thereby moving plate 52 outwardly, to which is fastened a flexible connection 53. Connection 53 extends through flexible tube 26. Tube 26 terminates at one end in the casing of lock 50 and at the other end in opening 25 in the end frame 23. When the lock 50 is released, the bolt 17 through connection 53 is withdrawn from engagement within distributor cap 12, this also causing movement of the insulation block 18, so as to bring movable contact 31 into engagement with the spring contact fingers 34 and 35, as shown in Fig. 5. The ignition circuit is thereby closed for normal running operation of the automobile. When it is desired to lock the ignition system against unauthorized use, the locking barrel 51 is depressed, against the action of the spring 55, into the casing of lock 50. This allows coil spring 29 to move the locking bolt 17 forwardly into locking engagement with the distributor cap 12, and also to move the insulation block 18 therewith, whereby to break the ignition circuit by moving the contact 31 out of bridging relation with the stationary spring contact fingers 34 and 35. This action causes the contact 37 to be brought into engagement with one of these stationary spring contact fingers, preferably with finger 35 connected in the distributor side of the ignition circuit, as shown in the drawings.

It will be observed that when the locking bolt 17 is in locked position, the circuit is grounded through the engagement of contact 37 with the contact 35, this grounding being through the locking bolt 17, the frame 23 and the portion supporting this frame on the vehicle.

It will be observed that I have provided a rigid lug 57 at the end of insulating block 18, which lug is adapted to receive one end of flexible connection 53. In the tubing 54 is a second flexible connection 59, which is rigidly attached at its forward end to the end of tubing 54 (see Fig. 1). The opposite end of this second connection 59 is connected to a spring pressed bar 60 slidably carried along one of side arms 22 of frame 23. Bar 60 is preferably disposed on the inside of this arm 22 and is adapted to have an apertured lateral lug 61 project through and ride in a slot 62 in the side frame member 22. On the outside of this side frame member 22 is a spring 63 fixed at one end at 64 and connected at the opposite end to the apertured lateral lug 61. The opposite end of bar 60 terminates in a laterally turned stop 66 adapted normally to lie under a lug 67 extending from a spring pressed pivotally mounted plate 68. Plate 68 is normally urged downwardly by a coil spring 69 secured at one end of its pivotal mounting as shown in Fig. 1. The tendency of spring 69 to press plate 68 downwardly is overcome by the laterally turned stop 66 lying directly under lug 67. The function of spring 63 is, however, to move stop 66 from lying under lug 67.

In the event the connection 59 is cut, this spring 63 is allowed to act whereby to move stop 66 forwardly from under lug 67. The plate 68 is then depressed so as to fall in the path of collar 20, as shown in dotted lines in Fig. 3, whereby it is impossible to withdraw bolt 17 from its locking engagement with distributor cap 12.

The purpose of this arrangement is that in the event an unauthorized user cuts the armoured cable 54 and the flexible coil 68' surrounding the same and without knowing which connection to move, accidently cuts the blind connection 59, he causes the plate 68 to drop, thereby effectively overcoming any subsequent attempt on his part to move the flexible connection 53 outwardly to withdraw bolt 17 from its locking position.

In Fig. 6, I have shown an auxiliary attachment associated with bolt 17 whereby when bolt 17 is in locking position, breaker or contactor arm 70 of distributor 10 is held in open position. This auxiliary attachment comprises a pivoted lever 71 within the distributor head having an arm 72 lying directly in front of locking bolt 17. The opposite end of the lever 71 is furnished with a right angle bend adapted to engage against the contactor, as shown, thereby moving it to open position and holding it there as long as locking bolt 17 is in locked position. This affords a double lock for breaking the ignition circuit so that there is no possibility of closing this circuit by tampering with the locking mechanism. With the timer-distributor mechanism effectively locked against access and with the circuit broken within the timer-distributor casing, there is no possibility of operating the ignition system, although a shunt might be successfully applied to the circuit on either side of the timer-distributor mechanism. If the shunt is applied in advance of the timer-distributor mechanism, the system would, notwithstanding, be inoperative due to the fact that the timer is then out of the circuit.

It will be observed that grounding of the ignition circuit, when broken, renders any attempt to provide a shunt ineffective, because should both sides of the circuit be located and connected with a shunt, the entire circuit still remains grounded through the contact 36. Furthermore, the provision of several connections leading to the locking mechanism, one or more of which are blind connections, increases the difficulty of successfully finding the proper connection by which to operate the lock. It is impossible to determine in advance by an electrical test, because one side of the circuit will be grounded, when the circuit is opened, which will destroy all indications.

I do not intend to limit the operation of lock 50 by a key, inasmuch as different actuating means may be employed equally as well.

Various modifications and alterations of the structure herein shown may be made without departing from the spirit and scope of my invention.

I claim:

1. In an ignition circuit, a movable contact in said circuit, means for actuating said contact to open said circuit and to ground one side thereof, a connection between said means and said contact, and a second connection provided with auxiliary locking means for locking said contact in open position in the event said connections are broken.

2. In an ignition circuit, a distributor, a housing therefore, a contact in said circuit, actuating means for locking said housing to said distributor and for moving said contact to open said circuit, auxiliary locking means for said housing and said contact, and a plurality of connections between said actuating means and said contact and auxiliary locking means, the cutting of one of said connections actuating said auxiliary locking means.

3. In an ignition circuit, a contact therein, key operated means, a connection between said contact and said key operated means whereby said contact may be locked in open circuit position, a second connection, and auxiliary locking means operable by said second connection when actuated to lock said contact against circuit closing movement.

4. In an ignition circuit, a slidable contact, a pair of stationary contacts in said circuit normally bridged by said movable contact, a grounded contact movable with said slidable contact, and locking means for moving said slidable contact whereby to bring said grounded contact in engagement with one of said stationary contacts.

5. In an ignition circuit, stationary contacts in the opposite sides of said circuit, a block of insulation, a contact on said block, means for normally urging said contact out of bridging relation with said stationary contacts, means for restraining said last means, and a grounded contact on said block adapted to engage one of said stationary contacts when said restraining means is released.

6. In an ignition circuit, a distributor, a housing therefor, and a circuit breaker provided with means for locking said housing to said distributor, including a contact, a locking bolt connected to said contact and movable therewith for entering said housing, and actuating means for said contact.

7. In an ignition circuit, a distributor, mechanism for locking said distributor against unauthorized access, and a plurality of operable connections leading to said mechanism, the operation of one of said connections actuating said mechanism, the operation of another connection locking said mechanism to prevent resetting of the first connection.

8. In an ignition circuit, a distributor having a circuit making-and-breaking contactor arm within, and means for locking said contactor arm in open position.

9. In an ignition circuit, a distributor having a circuit making-and-breaking contactor arm within, and means for locking said contactor arm in open position, said means locking said distributor to prevent unauthorized access to contactor arm.

10. In an ignition circuit, a distributor having a circuit making-and-breaking contactor arm within, a housing for distributor, and locking means for locking said housing to said distributor and for holding said contactor arm in open position.

11. In an ignition circuit, a distributor, locking mechanism provided with circuit breaking means for locking said distributor against unauthorized access, when the circuit is open, and for also breaking the circuit within said distributor.

12. In an ignition circuit, a movable contact in said circuit, means for actuating said contact to open said circuit, a connection between said means and said contact, and a second connection provided with auxiliary locking means for locking said contact in open position in the event said connections are broken.

13. In an ignition circuit, a distributor, a housing therefor, actuating means for locking said housing to said distributor, auxiliary locking means for said housing, and a plurality of connections between said actuating means and said auxiliary locking means, the cutting of one of said connections actuating said auxiliary locking means.

14. In an ignition circuit, a timer-distributor mechanism, a contact in said circuit, means for actuating said contact, said means grounding the breaker arm of timer-distributor mechanism when moving said contact to open circuit position, and means operable by said grounding means for preventing access to said distributor when said breaker arm is grounded.

15. In an ignition circuit, a timer-distributor mechanism, and mechanism for grounding the breaker arm of said timer-distributor mechanism, access to the interior of said distributor being prevented when said breaker arm is grounded.

16. In an ignition circuit, a timer-distributor mechanism, and mechanism for establishing a ground and for preventing access to the interior of said timer-distributor mechanism when said ground is established.

17. In an ignition circuit, a circuit breaker, a housing for said circuit breaker, and means for actuating said circuit breaker to establish a ground and to lock said housing against unauthorized removal.

18. In an ignition circuit, a contact in said circuit, a housing for said contact, and mechanism for moving said contact to open position for locking said housing against unauthorized removal and for introducing a ground in said circuit.

19. In an ignition circuit, a circuit breaker, a housing therefor, means for introducing a ground, and means for locking said housing to prevent unauthorized access to said circuit breaker when said ground is introduced.

20. In an ignition circuit, a timer-distributor mechanism, means for opening said circuit at said distributor, and means for introducing a ground when said circuit is opened.

21. In an ignition circuit, a timer-distributor mechanism, a circuit breaker for opening said circuit, and means for introducing a ground in said circuit at said timer-distributor mechanism when said circuit is opened by said circuit breaker.

22. In an ignition circuit, a timer-distributor mechanism, means for breaking said circuit at said timer-distributor mechanism, said means introducing a ground in said circuit when actuated to open said circuit, key operated means for actuating said means, and a mechanical connection between said key operated means and said means.

23. Theft preventing apparatus for automobiles comprising in combination, an ignition timer having a cup-shaped housing enclosing timer contacts, a cover for the housing, a key controlled device having a member movable within the housing, and devices cooperating with said member for rendering the ignition timer inoperative, and for preventing removal of the cover and said key controlled member from the housing.

24. Theft preventing apparatus for automobiles comprising in combination, an ignition timer having a cup-shaped housing enclosing timer contacts, a distributer head upon the timer housing, a key controlled device having a member movable within the housing, and devices cooperating with said member for locking the distributer head to the housing and for rendering the ignition timer inoperative.

25. Theft preventing apparatus for automobiles comprising in combination, an ignition timer having a cup-shaped housing enclosing timer contacts, a distributer head upon the timer housing, a key controlled device having a member movable within the housing, and devices cooperating with said member for locking the distributer head to the housing for preventing removal of said key controlled device from the housing and for rendering the ignition timer inoperative.

26. An anti-theft device for automobiles comprising an ignition timer having a housing containing make-and-break contacts one of which is mounted on a breaker lever, a cover for the housing, and lock controlled means for preventing cooperation of the timer contacts and for preventing removal of the cover.

27. An anti-theft device for automobiles comprising an ignition timer having a movable contact on a breaker lever engageable with a relatively stationary contact, a housing containing the contacts, a cover for the housing, and lock controlled means for maintaining the movable contact out of engagement with the stationary contact and for preventing removal of the cover.

28. The combination with a breaker mechanism, including a part subject to mechanical operation, of means for utilizing said mechanism as a switch for the control of ignition comprising manually operable lock control means acting upon said part for rendering said mechanism inoperative.

29. The combination with a rotable breaker cam, a breaker arm, and relatively movable breaker points, one of which is mounted on said arm, said arm being provided with a cam follower normally engaged with said cam for the mechanical intermittent closing of said contacts, of a separate means independent of said breaker cam for moving said breaker arm to a position in which said contacts are open, said means comprising a part reciprocable between extreme positions and formed to engage a portion of said breaker arm in the course of its movement from its normal position to the other of said positions, said part being normally out of contact with said arm and adapted to permit an uninterrupted freedom of mechanical operation of said arm, together with a remote lock controlled manually operable member operatively connected to govern the reciprocation of said part.

30. The combination with a timer casing, a breaker arm therein and means for the mechanical actuation of said breaker arm, of motion transmitting connections leading to said casing, a plunger reciprocable through the wall of said casing and operatively arranged to be governed in its reciprocation by said connections, lock mechanism controlling said connections, and a finger connected with said breaker arm and disposed in the path of movement of said plunger, said finger being free to move in accordance with mechanically induced operation of said breaker arm in one position of said plunger and being adapted to be engaged by said plunger to force said breaker arm to an inoperative location when said plunger is reciprocated from said position.

31. The combination with a timer casing, a breaker cam and a breaker arm provided with a cam follower and adapted intermittently to open and close a circuit in accordance with the movement of said cam, of a plunger reciprocable through the wall of said timer casing, a spring acting on said plunger to reciprocate it in one direction, remote manually operable means for reciprocating said plunger in the opposite direction, and a finger carried by said breaker arm and disposed in the path of reciprocation of said plunger whereby to be engaged thereby in a direction of movement of said plunger tending to draw said arm to an inoperative position in which said circuit is open.

32. The combination with a breaker cam, a breaker arm and a set of breaker points one of which is carried by said arm, said arm being provided with a cam follower normally interacting with said cam for the intermittent closing of said points, of an adjustable part adapted to engage said arm to move it to a position in which said points are open, a spring acting on said part in a direction to cause such engagement and to maintain said points open, and lock controlled motion transmitting connections leading to said part and opposed to said spring whereby said part may be adjusted to a position in which said breaker arm is operatively subject to the control of said cam.

33. The combination with a timer including a breaker arm and a casing therefor, of a plunger reciprocable into said casing, a finger carried by said breaker arm and disposed in the path of movement of said plunger, a remote key controlled lock, and a reciprocable member connected with said lock and leading to said plunger and adapted to control the position thereof, said plunger being adapted for one direction of movement to attract said breaker arm to an inoperative position.

34. The combination with a timer casing and a cover therefor, of a member within said casing normally mechanically operable in the performance of a timer function, and means for retracting said member to an inoperative position and simultaneously securing said cover against removal from said casing.

35. The combination with a timer casing and a cover therefor, of a member within said casing normally mechanically operable in the performance of a timer function, and means for retracting said member to an inoperative position and simultaneously securing said cover against removal from said casing, said means including an apertured ear dependent from said cover, a movable part with which a portion of said member is adapted to interact for the retraction of said member and an interlocking device carried by said part and adapted to engage said ear when said part is moved in a direction to retract said member.

36. A device for controlling through the ignition circuits the operation of an internal combustion engine, said device comprising a breaker cam, a relatively fixed contact, and relatively movable contact means normally arranged to follow said cam for mechanical make and break of engagement with said relatively fixed contact, together with a control operatively adapted to withdraw said means wholly from engagement with said contact.

37. A device for controlling through the ignition circuit the operation of an internal combustion engine, said device comprising a breaker cam, a relatively fixed contact, and relatively movable contact means normally arranged to follow said cam for mechanical make and break of engagement with said relatively fixed contact, together with a control operatively adapted to withdraw said means wholly from engagement with said contact, said control being provided with mechanical connections for manual manipulation.

38. A device for controlling through the ignition circuits the operation of an internal combustion engine, said device comprising a breaker cam, a relatively fixed contact, and relatively movable contact means normally arranged to follow said cam for mechanical make and break of engagement with said relatively fixed contact, together with a control operatively adapted to withdraw said means wholly from engagement with said contact, said control being provided with mechanical connections for manual manipulation, and provided with a lock adapted to restrain said control in a position in which said means is wholly disengaged from said contact.

39. The combination with a breaker mechanism including a cam, a relatively fixed contact, and cam follower means carrying a relatively movable contact engageable and disengageable with said fixed contact, of a manually adjustable part reciprocable to and from the path of movement of said means in a position to obstruct said means wholly from engagement with said fixed contact, whereby the closing of a circuit between said means and said fixed contact is wholly prevented in the advanced position of said part and is purely mechanically controlled in the retracted position of said part.

40. The combination with a breaker mechanism including a cam, a relatively fixed contact, and cam follower means carrying a relatively movable contact engageable and disengageable with said fixed contact, of a manually adjustable part reciprocable to and from the path of movement of said means in a position to obstruct said means wholly from engagement with said fixed contact, whereby the closing of a circuit between said means and said fixed contact is wholly prevented in the advanced position of said part and is purely mechanically controlled in the retracted position of said part, said part being provided with connections for operative manual adjustment between said positions, and a lock adapted to secure said part in its advanced position.

41. In a distributor, an interrupter, means for rendering said interrupter inoperative, a metal casing enclosing said interrupter, and a metal cover for said casing rotatable therein and having an ear engageable by said means when in a position to render said interrupter inoperative to prevent the removal of said cover from the casing.

42. In a distributor, an interrupter, means for preventing the interrupter from closing, said interrupter and means being enclosed in a metal casing, and a cover for said casing which is removable when said means is in a position to permit said interrupter to close, said cover and means having interengaging portions which prevent the cover being moved to a position from which it can be removed from the casing when said means is in a position to prevent the interrupter from closing.

43. In combination with a timer-distributor mechanism including an interrupter and means for preventing the interrupter from closing, of a metal casing for enclosing said interrupter and said means, and a cover for said casing which is removable when said means is in a position to permit said interrupter to close, said cover and means having interengaging portions which prevent the cover being moved to a position from which it can be removed from the casing when said means is in a position to prevent the interrupter from closing, said casing being parted in two sections so that each section encloses part of said timer-distributor mechanism.

44. In a distributor, an interrupter, a metal casing enclosing said interrupter and having a lateral passage, and means lying partly within said passage for rendering said interrupter inoperative, said means being separately assembled and inserted into said passage, said means including a longitudinally movable member operable by a lock tumbler, and a flexible member connecting said member and the movable part of said means lying partly within said passage.

45. In an ignition lock, a distributor-timer including a casing, and a cam operated breaker arm therein, of means for adjusting said arm to circuit-breaking position and locking it in such position.

46. In an ignition lock, and in combination with the instrument board of a vehicle, and a distributor-timer having a cam operated breaker arm, of guarded means extending between the instrument board and distributor-timer for shifting the breaker arm to inoperative position and locking it in such position.

47. In an ignition lock, and in a combination with a vehicle instrument board, and a distributor-timer including a casing and a breaker arm in said casing, of a locking bar for shifting said arm into and out of said position, means coacting with said bar arranged between the same and the instrument board for shifting the breaker arm to an inoperative position and locking it in such position, and a guard enclosing the locking bar and its operating means.

48. In an ignition lock, a distributor-timer casing, a rotary cam in said casing, a breaker arm controlled by the cam, means extending into said casing for moving the breaker arm to circuit breaking position, and means for locking said parts in such position.

49. In an ignition lock, a distributor-timer casing, a rotary cam therein, a breaker arm controlled by the cam, a shifting member connected with said arm for moving it to circuit breaking position, a guard overlying the connection between the breaker arm and shifting member, externally arranged means for actuating said shifting member and locking the same and the arm in circuit breaking position, and a guard enclosing the latter-named means.

50. In an ignition system, a timer-distributor, a switch for opening and closing the ignition circuit, and means operable to permit access to the interior of said distributor only when the ignition circuit is closed by said switch.

ARCHIE W. FARRELL.